United States Patent
Kuo et al.

(10) Patent No.: US 7,073,047 B2
(45) Date of Patent: Jul. 4, 2006

(54) CONTROL CHIP AND METHOD FOR ACCELERATING MEMORY ACCESS

(75) Inventors: Kuang-Kai Kuo, Taipei Hsien (TW); Kuo-Ping Liu, Taipei (TW)

(73) Assignee: VIA Technologies, Inc., Taipei Hsien (TW)

( * ) Notice: Subject to any disclaimer, the term of this patent is extended or adjusted under 35 U.S.C. 154(b) by 161 days.

(21) Appl. No.: 10/064,454

(22) Filed: Jul. 17, 2002

(65) Prior Publication Data
US 2003/0167386 A1 Sep. 4, 2003

(30) Foreign Application Priority Data
Mar. 1, 2002 (TW) ............................... 91103729 A

(51) Int. Cl.
*G06F 12/00* (2006.01)
(52) U.S. Cl. ............... 711/220; 711/150; 711/210; 365/189.04; 365/189.07
(58) Field of Classification Search ............... 711/167, 711/168, 169, 211, 213, 220
See application file for complete search history.

(56) References Cited

U.S. PATENT DOCUMENTS 5,379,379 A * 1/1995 Becker et al. ............. 711/3
5,497,355 A * 3/1996 Mills et al. ............. 365/230.08
5,954,813 A * 9/1999 Mann et al. ............. 712/43
6,618,724 B1 * 9/2003 Pollak ............. 707/6

* cited by examiner

*Primary Examiner*—Pierre M. Vital
(74) *Attorney, Agent, or Firm*—Jianq Chyun IP Office

(57) ABSTRACT

A control chip and operating method for accelerating memory access that can be applied to a memory system whose memory read command actual address is read from a system bus in a number of synchronous transmissions. On receiving a first section read address, the control chip operates to compare the first section read address with an identical bit portion of the write address of the memory-write commands inside a memory-write command queue. If the comparison indicates some difference, permission for executing the memory read command is granted. If the comparison indicates the presence of identical bits, a second section read address is received and compared with an identical bit portion of the write address of the memory-write commands inside a memory-write command queue. If the comparison indicates some difference, permission for executing the memory read command is granted. If the comparison indicates the presence of identical bits, permission for executing the memory read command is granted only after the memory-write command inside the memory-write command queue having an identical write address is executed.

10 Claims, 4 Drawing Sheets

| Bit Times | SADDOUT[14:2] # | | | | | | | | | | | |
|---|---|---|---|---|---|---|---|---|---|---|---|---|
| | 14 | 13 | 12 | 11 | 10 | 9 | 8 | 7 | 6 | 5 | 4 | 3 | 2 |
| 0 | M1 | Command[4:0] | | | | | PA[31:25] | | | | | |
| 1 | PA[24:12] | | | | | | | | | | | |
| 2 | M2 | Mask[7:0] | | | | | | | CH | ID[2:0] | | |
| 3 | RV | PA[34:32] | | | PA[11:3] | | | | | | | |

FIG. 2

CONTROL CHIP AND METHOD FOR ACCELERATING MEMORY ACCESS

CROSS REFERENCE TO RELATED APPLICATIONS

This application claims the priority benefit of Taiwan application serial No. 91 103729, filed on Mar. 1, 2002.

BACKGROUND OF INVENTION

1. Field of Invention

The present invention relates to a control chip. More particularly, the present invention relates to a control chip and method for accelerating memory access.

2. Description of Related Art

Following the rapid progress in electronic technologies, people rely heavily on the processing capability of various electronic devices. In general, electronic devices operate in a distributed environment. In a distributed environment, a control chip communicates data with a central processing unit (CPU) through a system bus. The amount of information transferred between the two increases as the processing power of the CPU increases. Correspondingly, the number of data bits and address bits that needs to be transferred via the system bus also increases. To prevent a corresponding increase in the pin count of a CPU, the data bits and address bits are transmitted in a number of bus clock cycles. However, for this type of data transfer, the memory read command received by the control chip must be received after the memory write command in the memory write command queue having the same write-in address is transferred, otherwise, memory read errors may occur. Thus, the control chip must wait until all the separately transferred bit addresses have arrived and been compared with the write address of the memory write command stored inside the memory write command queue before execution. Consequently, processing speed of the control chip is severely lowered. In addition, the control chip uses a rather complicated method to process the memory read commands. Hence, performance of the control chip is relatively low.

SUMMARY OF INVENTION

Accordingly, one object of the present invention is to provide a control chip and an operating method for accelerating memory access. By increasing the processing speed of memory read commands, performance of the control chip is increased. Furthermore, the memory read command received by the control chip is also prevented from executing before the memory write command stored inside the memory write command queue with an identical write address is executed.

To achieve these and other advantages and in accordance with the purpose of the invention, as embodied and broadly described herein, the invention provides a control chip for accelerating memory access. The control chip is coupled to at least one system bus operating with a clock signal. The control chip includes a memory write command queue, a bus interface unit and a memory request organizer. The memory-write command queue is used to hold a plurality of memory write commands. Each memory-write command further includes a write address. The bus interface unit is coupled to the system bus. The system bus sequentially receives the first section read address and the second section read address according to the clock signal and then outputs the first section read address and the second section read address.

The memory request organizer is coupled to the bus interface unit and the memory-write command queue for comparing the first section read address with an identical bit portion of the write address of the memory write commands inside the memory write command queue. If the result of comparison shows that they are different, execution of the memory read command is granted. On the other hand, if the result of comparison shows that the are identical, a second comparison is carried out to compare the second section read address with an identical bit portion of the write address of the write commands inside the memory-write command queue. If the result of second comparison shows that they are different, execution of the memory read command is granted. On the other hand, if the result of second comparison shows that they are identical, execution of the memory read command is granted only after the memory-write command inside the memory-write command queue having an identical write address is executed.

This invention also provides a control chip having a memory request organizer for accelerating memory access. The memory request organizer includes a first section address read/compare unit, a second section address read/compare unit and a grant decision unit. The first section address read/compare unit is coupled to a bus interface unit and a memory-write command queue. The first section address read/compare unit receives a first section read address, compares the first section read address with an identical bit portion of the memory address of the memory-write command inside the memory-write command queue and outputs a first comparison signal. The second section address read/compare unit is coupled to the bus interface unit and the memory-write command queue. The second section address read/compare unit receives a second section read address, compares the second section read address with an identical bit portion of the memory address of the memory-write command inside the memory-write command queue and outputs a second comparison signal. The grant decision unit is coupled to the first section address read/compare unit and the second section address read/compare unit. The grant decision unit receives the first comparison signal and the second comparison signal to generate a grant signal. If the first comparison signal or the second comparison signal indicates a difference in the comparison, the grant decision unit issues a grant signal. Otherwise, the grant decision unit issues a grant signal only after the memory-write command inside the memory-write command queue having an identical write address is executed.

This invention also provides a control chip having a memory request organizer for accelerating memory access. The memory request organizer further includes a memory command control unit coupled to the grant decision unit for receiving a grant signal and directly transmitting a memory read command into or out of a memory read command queue.

In one embodiment of this invention, the system bus is a S2K bus as defined by the corporation AMD. Furthermore, the system bus is connected to a K7 series central processing unit of AMD. Each rising edge and falling edge of the clock signal in the system bus is defined to be a single bit time unit and the first section read address is transmitted in two bit time units.

This invention also provides a method of operating a control chip connected to a system bus such that memory access is accelerated. The control chip at least includes a memory-write command queue for holding a plurality of memory-write commands. Each memory-write command includes a write address. The system bus at least includes a clock signal capable of sequentially transmitting the first section read address and the second section read address of a memory read command. The method of operating the control chip includes the following steps. First, the control chip picks up a first section read address from the system bus. The first section read address is compared with the identical bit portion of the write address of the memory-write command inside the memory-write command queue. If the comparison indicates a difference, execution of the memory read command is granted. The control chip then picks up the second section read address from the system bus. The second section read address is compared with the identical bit portion of the write address of the memory-write command inside the memory-write command queue. If the comparison indicates a difference, execution of the memory read command is granted. On the other hand, if the comparison indicates the two are actually identical, execution of the memory read command is granted only after the memory-write command inside the memory-write command queue having an identical write address is executed.

In the operating method according to this invention, the rising edge and the falling edge of a clocking cycle in the system bus are each defined to be a single bit time unit. The first section read address is transmitted in two bit time units. When execution of the memory read command is granted, the memory read command is directly transmitted into or out of a memory read command queue.

The application of the control chip and operating method according to this invention is able to speed up memory access. As soon as the control chip receives the first section read address, the first section read address is immediately compared with an identical bit portion of the write-in commands inside the memory-write command queue. The execution of memory read command is immediately granted if the comparison indicates a difference. If the comparison indicates identical bits, the control chip picks up the second section read address and compares the second section read address of the memory read command with an identical bit portion of the write-in commands inside the memory-write command queue. The execution of memory read command is also granted if the comparison indicates a difference. On the other hand, if the comparison still indicates the presence of identical bits, execution of the memory read command is delayed until the memory-write command inside the memory-write command queue having an identical write address is executed. In this way, execution of each memory read command need not wait until all bit addresses necessary for separate transmissions have arrived. Hence, performance of the control chip is improved and execution of a memory read command received by the control chip before the execution of a memory-write command inside the memory-write command queue having an identical write address is prevented.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 2 is a listing showing the definition of separate address transmission of a S2K bus according to the preferred embodiment of this invention;

DETAILED DESCRIPTION

Figure 1:
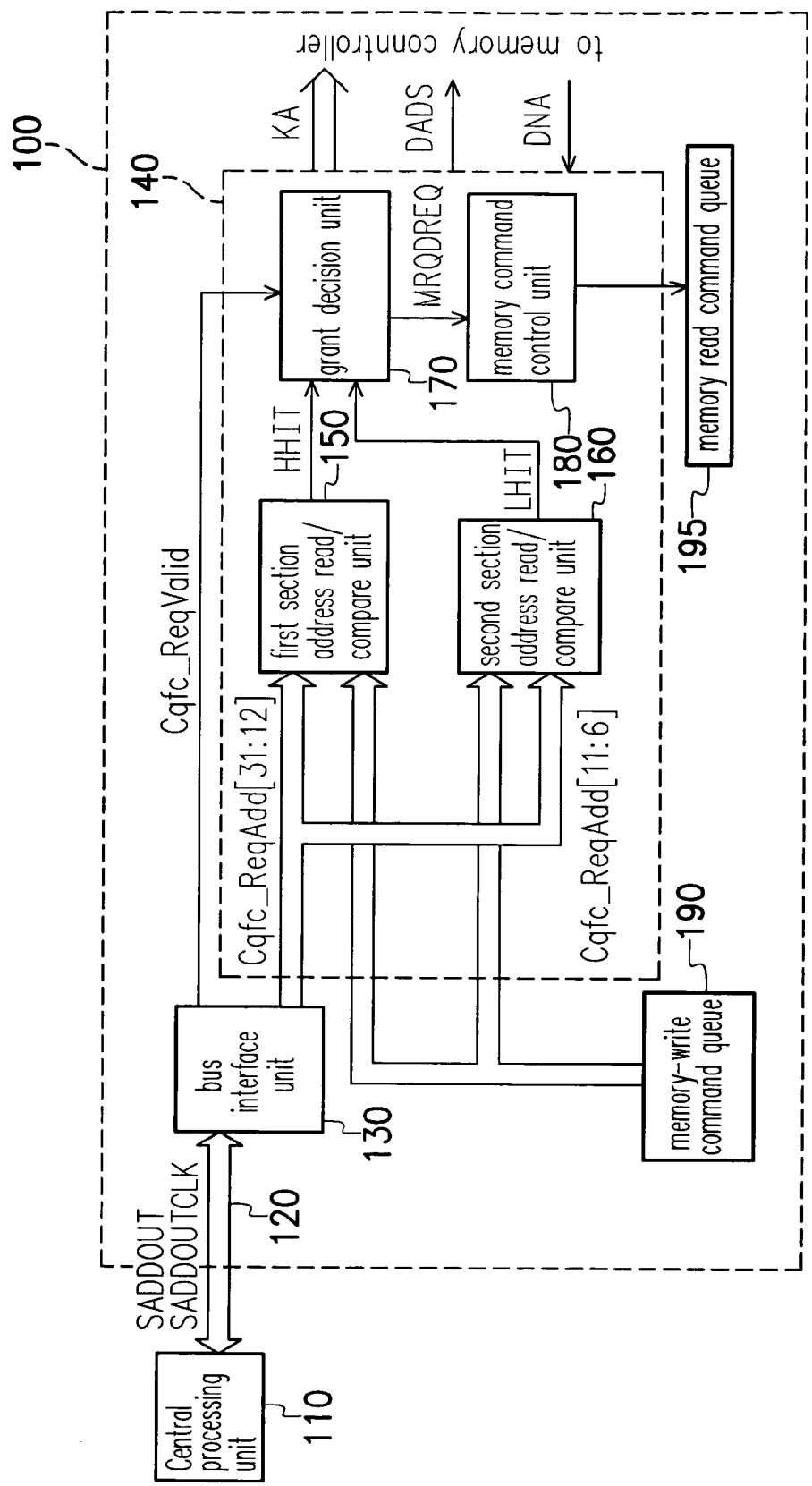
FIG. 1 is a block diagram showing the components and interconnections inside a control chip capable of accelerating memory access according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram showing the components and interconnections inside a control chip 100 capable of accelerating memory access according to one preferred embodiment of this invention. The control chip 100 not only enhances memory access performance, but also prevents the execution of any memory read command before executing the memory-write command inside the memory-write command queue having an identical write address. As shown in FIG. 1, the control chip 100 includes a memory-write command queue 190, a bus interface unit 130 and a memory request organizer 140. The memory request organizer 140 further includes a first section address read/compare unit 150, a second section address read/compare unit 160 and a grant decision unit 170. A memory command control unit 180 may also be incorporated to interface with the grant decision unit 170. The memory-write command queue 190 is capable of holding a plurality of memory-write commands.

Each memory-write command has a write address. The bus interface unit 130 is coupled to a system bus 120. The system bus 120 is a S2K bus connected to a K7 series central processing unit 110 manufactured by AMD, for example. The S2K bus has a system address output clock signal line SADDOUTCLK and a system address output bus SADDOUT. The central processing unit 110 transmits the actual address from SADDOUT[14:2] in separate transmissions according to the rising edge and the falling edge of the system address output-clock signal. The rising edge and the falling edge of the system address output clock signal is defined to a single bit time. The transmission format is shown in FIG. 2. As shown in FIG. 2, each memory read command requires four bit times. In bit time zero, bits 31~25 (PA[31:25]) of the actual address are transmitted. In bit time one, bits 24~12 (PA[24:12]) of the actual address are transmitted. In bit time three, bits 34~32 and bit 11~3 (PA[34:32] and PA[11:3]) of the actual address are transmitted. Hence, when the bus interface unit 130 receives the memory read command from the system bus 120, the actual address of the memory read command is also obtained from SADDOUT.

Figure 3:
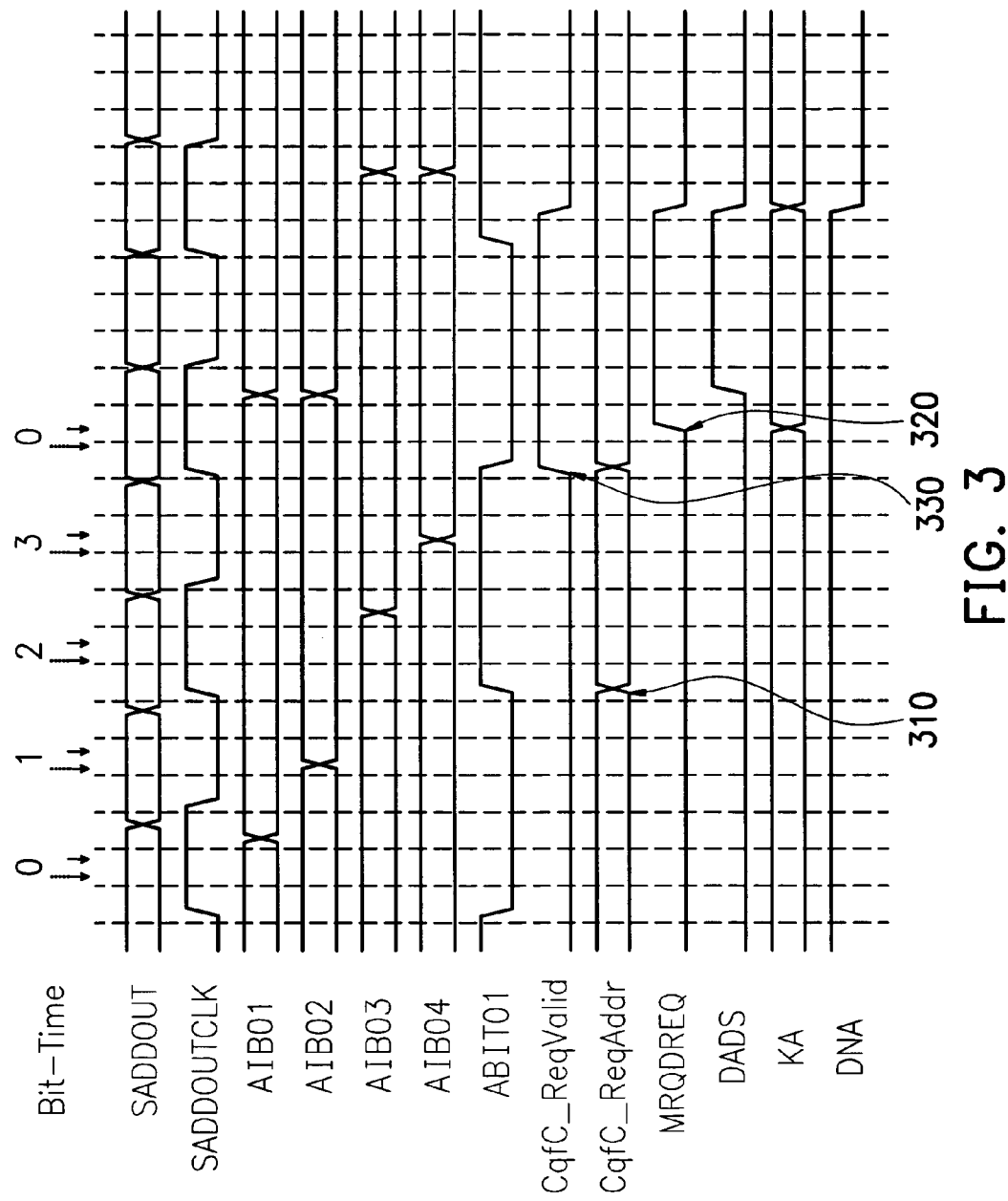
FIG. 3 is a timing diagram showing various signal traces produced by the control chip according to the preferred embodiment of this invention.

To provide a deeper explanation of control chip operation, refer to the timing diagram in FIG. 3. In fact, FIG. 3 is a timing diagram showing various signal traces produced by the control chip according to the preferred embodiment of this invention. When SADDOUT transmits the actual address PA[31:25] in bit time zero, AIB01 of the bus interface unit 130 is refreshed. When SADDOUT transmits the actual address PA[24:12] in bit time one, AIB02 of the bus interface unit 130 is refreshed. Similarly, the content transmitted during bit time two will refresh AIB03 of the bus interface unit 130 and the actual address PA[34:32] and PA[11:3] transmitted during bit time three will refresh AIB04 of the bus interface unit 130. Note that frequency of AIBT01 of the bus interface unit 130 is half of SADDOUT-CLK. Hence, after the bus interface unit 130 receives the actual address PA[31:12] at bit time zero and bit time one, the first section read address[31:12] of the memory read command is refreshed through Cqfc_ReqAddr. As shown in label 310 of Cqfc_ReqAddr in FIG. 3, the bus interface unit 130 coupled first section address read/compare unit 150 picks up the first section read address[31:12]. Thereafter, the first section read address[31:12] is compared with identical bit portion of write address of the memory-write commands inside the memory-write command queue to output a first comparison signal HHIT to the grant decision unit 170. If the first comparison signal HHIT indicates a mismatch between identical bits, the grant decision unit 170 submits a grant execution signal MRQDREQ in bit time zero of the next command while a successive read command is followed, or the grant decision unit 170 submits a grant execution signal MRQDREQ immediately after the read command is totally received in bit time 3, as shown in label 320. On receiving the grant execution signal MRQDREQ, the memory command control unit 180 transfers the memory read command into a memory read command queue 195. Alternatively, the signal DADS is enabled so that the actual address of the memory read command is placed on the KA bus and transmitted to a memory controller. In the meantime, the memory controller responds with a DNA signal.

On the other hand, if the first comparison signal HHIT indicates the first section read address[31:12] is identical to the bit portion of the write address of the memory-write commands inside the memory-write command queue after the comparison, actual address PA[11:3] received by the bus interface unit 130 during bit time three is compared. The actual address PA[11:3] will refresh the second section read address PA[11:3] of the memory read command through Cqfc_ReqAddr and enable Cqfc_ReqValid signal to signify the end of address transmission as shown in label 330 of FIG. 3. The second section read address PA[11:3] is picked up by the second portion address read/compare unit 160 coupled with the bus interface unit 130. Bits PA[11:6] inside the second portion read address is compared with identical bits of the write address of the memory-write commands inside the memory-write command queue to produce a second comparison signal LHIT. The second comparison signal LHIT is transferred to the grant decision unit 170 coupled next to the second portion address read/compare unit 160. Note that only bits PA[11:6] are compared in this embodiment because the central processing unit generally accesses the memory in batches. If the second comparison signal LHIT indicates some bit difference, the grant decision unit 170 enables the grant execution signal MRQDREQ. However, if the second comparison signal LHIT indicates the bits are still identical, the grant execution signal MRQDREQ is output only after the memory-write command inside the memory-write command queue having an identical write address is executed.

According to the aforementioned description, a method of operating the control chip to accelerate memory access is gathered. The method is capable of improving the performance of the control chip and preventing the execution of a memory read command received by the control chip before the memory-write command inside the memory-write command queue having an identical actual address is executed. Actual address of the memory read command comes from the system but S2K. The system bus S2K has a system address output clock signal line SADDOUTCLK. According to the rising edge and the falling edge of the system address output clock, the actual address is transferred from the system address output bus SADDOUT of the system bus S2K in separate synchronized transmissions. The rising edge and the falling edge of the system address output clock signal is defined as bit time.

Figure 4:
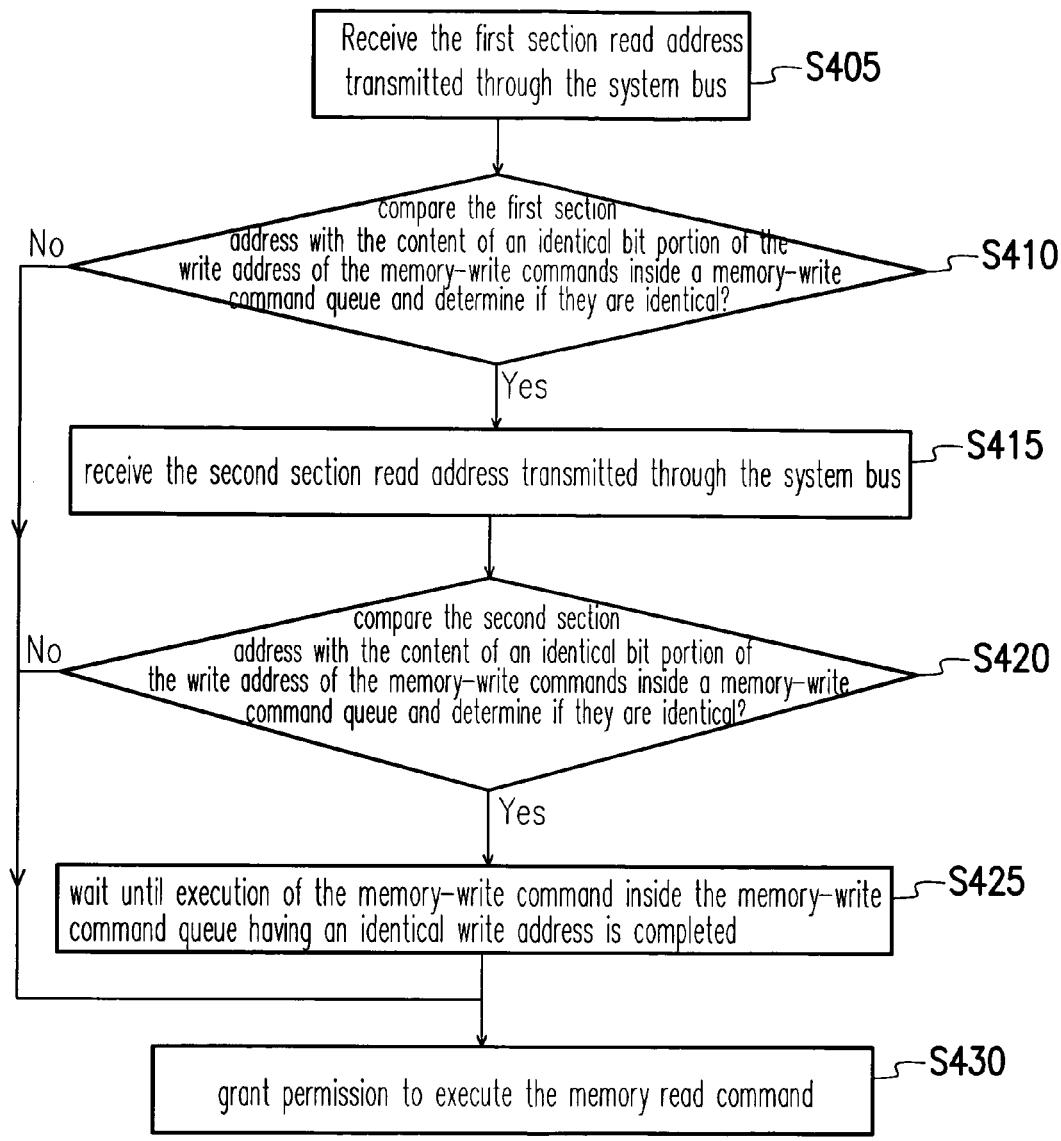
FIG. 4 is a flow chart showing the steps for operating the control chip according to the preferred embodiment of this invention.

FIG. 4 is a flow chart showing the steps for operating the control chip according to the preferred embodiment of this invention. First, the control chip receives a first section read address PA[31:12] (S405) from the system address output bus SADDOUT. The first section read address PA[31:12] is compared with identical bit portion of the write address of the memory-write command inside the memory-write command queue (S410). If the comparison indicates some difference, execution of the memory read command is granted (S430). If the comparison indicates the bits are identical, the second section read address PA[11:3] on the system address output bus is received (S415). The second section read address PA[11:6] of the memory read command is compared with an identical bit portion of the write address of the memory-write commands inside the memory-write command queue (S420). If the comparison indicates some difference, execution of the memory read command is granted (S430). However, if the comparison indicates the presence of identical bits, execution of the memory read command is granted (S430) only after the memory write command inside the memory-write command queue having an identical write address is executed (S425). Note that as soon as the first comparison signal HHIT indicates a difference, the signal MRQDREQ signal is enabled during bit time zero in the next read command so that execution of the read command is granted instead of having to wait for the result of the second comparison LHIT. Hence, the command is read one clocking cycle ahead, thereby improving the performance of the control chip.

In one embodiment of the method of operating a control chip to accelerate memory access, the first section read address is transmitted during bit time zero and bit time one. After granting the execution of the memory read command, the memory read command is directly output or transferred to the memory read command queue 195 for storage.

In conclusion, the control chip and operating method for accelerating memory access includes performing an immediate comparison between a portion of the bit address PA[31:12] with an identical bit portion of the write address of the memory-write commands inside the memory-write command queue as soon as the control chip receives the bit address PA[31:12] during bit time zero and bit time one. If the comparison indicates some difference, permission to execute the memory read command is granted. Execution of each memory read command need not wait for the arrival of all bit address transmitted in separate transmissions. Ultimately, the memory read command may execute one cycle ahead so that performance of the control chip is greatly boosted.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A control chip for accelerating memory access, wherein said control chip is coupled to a system bus at least having a clocking line, said control chip comprising:
   a memory write command queue for holding a plurality of memory write commands, wherein each said memory write command has a write address;
   a bus interface unit coupled to the system bus, wherein said bus interface unit receives a first section read address and a second section read address of a memory read command sequentially from said system bus according to a clock signal and concurrently outputs said first section read address and said second section read address; and
   a memory request organizer coupled to the bus interface unit and said memory write command queue for comparing said first section read address with an identical bit portion of each said write address of said memory-write commands inside said memory-write command queue;
   wherein if the comparison indicates a difference, execution of said memory read command would be permitted; if the comparison indicates the presence of identical bits, said second section read address would be compared with an identical bit portion of each said write address of said memory-write commands inside said memory-write command queue;
   wherein if the comparison indicates a difference, execution of said memory read command would be permitted; if said comparison still indicating said presence of identical bits, permission to execute said memory read command would be delayed until the memory-write command with identical address bits inside said memory-write command queue executes;
   wherein said first section read address and said second section read address are compared respectively before they are combined.

2. The control chip of claim 1, wherein said memory request organizer further includes:
   a first section address read/compare unit coupled to the bus interface unit and said memory-write command queue for receiving said first section read address, comparing said first section read address with an identical bit portion of said write address of said memory-write commands inside said memory-write command queue and outputting a first comparison signal;
   a second section address read/compare unit coupled to the bus interface unit and said memory-write command queue for receiving said second section read address, comparing said second section read address with an identical bit portion of said write address of said memory-write commands inside said memory-write command queue and outputting a second comparison signal; and
   a grant decision unit coupled to the first address read/compare unit and said second address read/compare unit for receiving said first comparison signal and said second comparison signal, determining and setting up a grant execution signal, wherein when either said first comparison signal or said second comparison signal indicates a difference, said grant execution signal is set, otherwise, said grant execution is set only after the memory-write command with identical address bits inside said memory-write command queue executes.

3. The control chip of claim 2, wherein said memory request organizer further includes:
   a memory command control unit coupled to the grant decision unit for receiving said grant execution signal and outputting said memory read command directly or transferring said memory read command to a memory read command queue for storage.

4. The control chip of claim 1, wherein the rising edge and the falling edge of said clock signal are respectively defined as a bit time period, and two bit time periods are required to transfer said first section read address.

5. The control chip of claim 1, wherein said comparison of said first section read address with an identical bit portion of said write command includes comparing with bits 12 to 31 of said write address.

6. The control chip of claim 1, wherein said comparison of said second section read address with an identical bit portion of said write command includes comparing with bits 6 to 11 of said write address.

7. A method of operating a control chip for accelerating memory access wherein said control chip couples with a system bus and includes at least a memory-write command queue for holding a plurality of memory-write commands with each said memory write command further including a write address, said method comprising the steps of:
   receiving a first section read address transmitted through said system bus;
   comparing said first section read address with an identical bit portion of each said write address of said memory-write commands inside said memory-write command queue;
   if the comparison indicates some difference, permitting execution of a memory read command associated with the first section read address;
   receiving a second section read address transmitted through said system bus;
   comparing said second section read address with an identical bit portion of each said write address of said memory-write commands inside said memory-write command queue, and
   if the comparison indicates some difference, permitting said execution of said memory read command; and
   if the comparison indicates a presence of identical bits, waiting until said memory-write command inside said memory-write command queue, having an identical write address is executed before permitting said execution of said memory read command;
   wherein said first section read address and said second section read address are compared respectively before they are combined.

8. The method of claim 7, wherein the rising edge and the falling edge of a clock signal are respectively defined as a bit time period, and two bit time periods are required to transmit said first section read address.

9. The method of claim 7, wherein said memory read command is directly output or transferred to a memory read command queue inside said control chip when execution of said memory read command is permitted.

10. The method of claim 9, wherein when a comparison between said first section read address and an identical bit portion of each said write address of said memory-write commands inside said memory-write command queue indicates some difference, a flag for permitting said execution of said memory read command is raised immediately after totally receiving said memory read command.

* * * * *